United States Patent
Ueno et al.

(10) Patent No.: US 8,503,774 B2
(45) Date of Patent: Aug. 6, 2013

(54) APPARATUS, METHOD AND COMPUTER READABLE MEDIUM FOR PERFORMING SOLID-LINE CONVERSION FROM LINES HAVING BREAKS

(75) Inventors: Kunikazu Ueno, Kanagawa (JP); Shinichi Yada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 551 days.

(21) Appl. No.: 12/776,929

(22) Filed: May 10, 2010

(65) Prior Publication Data

US 2011/0064305 A1    Mar. 17, 2011

(30) Foreign Application Priority Data

Sep. 15, 2009   (JP) .................................. 2009-212684

(51) Int. Cl.
 *G06K 9/00*    (2006.01)
(52) U.S. Cl.
 USPC ......................................................... 382/165
(58) Field of Classification Search
 None
 See application file for complete search history.

(56) References Cited

U.S. PATENT DOCUMENTS

2009/0028388 A1 *    1/2009   Amagasaki ................... 382/104

FOREIGN PATENT DOCUMENTS

| JP | A-5-12489 | 1/1993 |
|---|---|---|
| JP | A-5-40847 | 2/1993 |
| JP | A-5-174186 | 7/1993 |
| JP | A-7-230525 | 8/1995 |
| JP | A-10-97588 | 4/1998 |
| JP | A-10-214310 | 8/1998 |
| JP | A-11-232382 | 8/1999 |
| JP | B2-3140079 | 12/2000 |

* cited by examiner

*Primary Examiner* — Nirav G Patel
(74) *Attorney, Agent, or Firm* — Oliff & Berridge, PLC

(57) ABSTRACT

An image processing apparatus includes an image receiving section, a succession value image generating section and a solid converting section. The image receiving section receives an image contains a line having breaks. The succession value image generating section generates a succession value image having as a pixel value the number of times of succession of black or white pixels in the image received by the image receiving section. The solid-line converting section, based on the succession value image generated by the succession value image generating section, performs solid-line conversion in which the line having breaks is changed into a solid line.

10 Claims, 18 Drawing Sheets

FIG. 3A
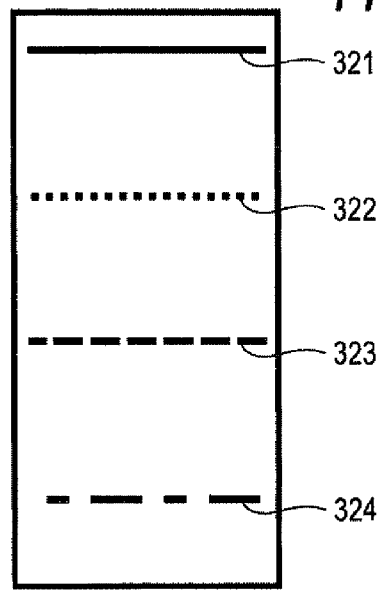
FIG. 3B
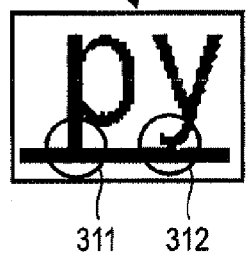
FIG. 3C

FIG. 4A
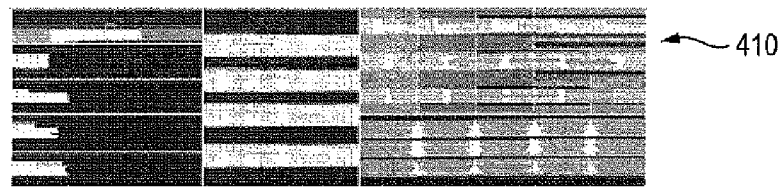
FIG. 4B
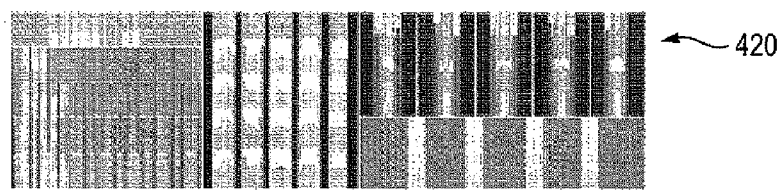
FIG. 5A
Tue
火
B
FIG. 5B
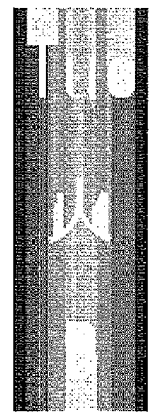

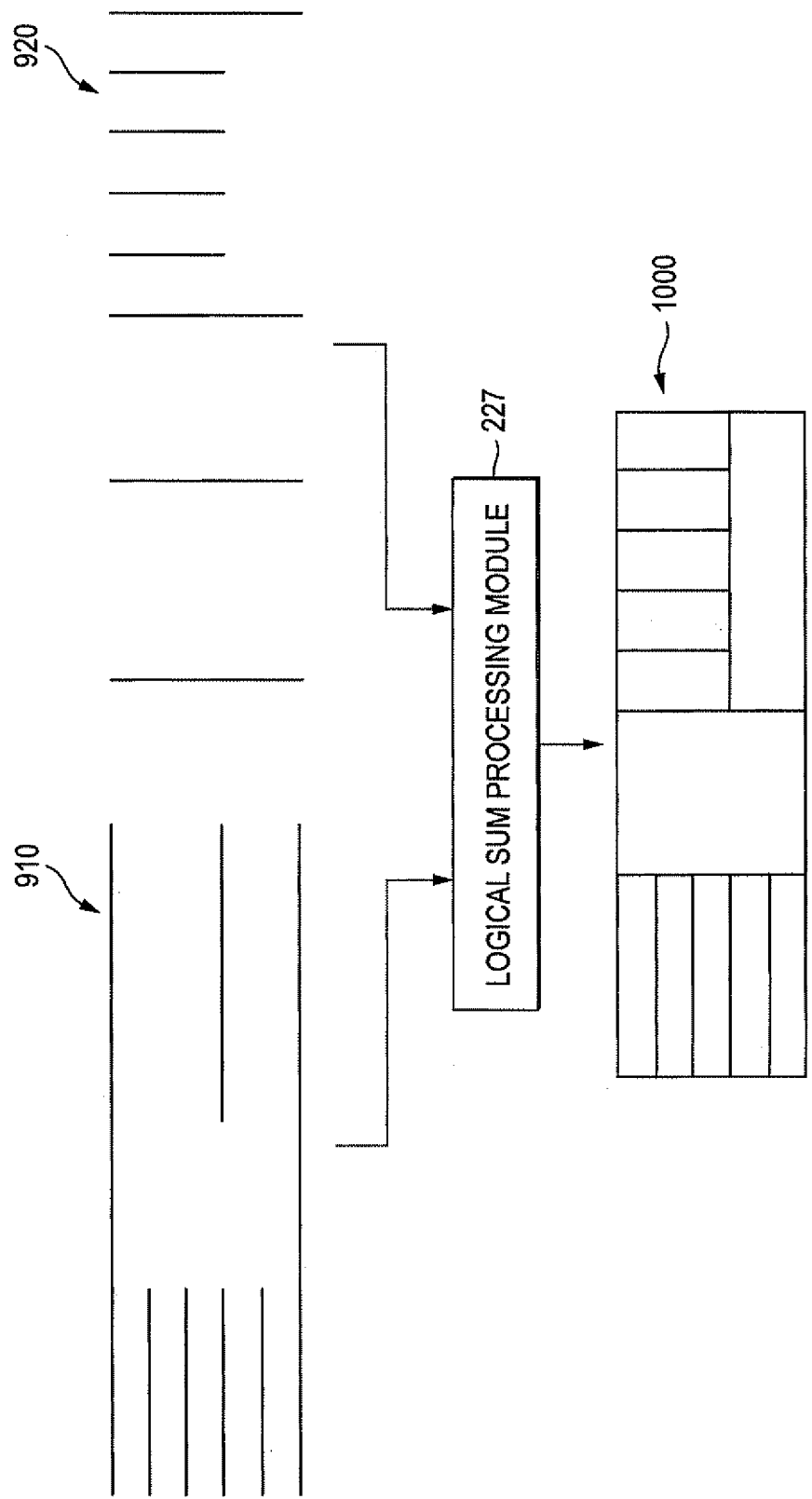

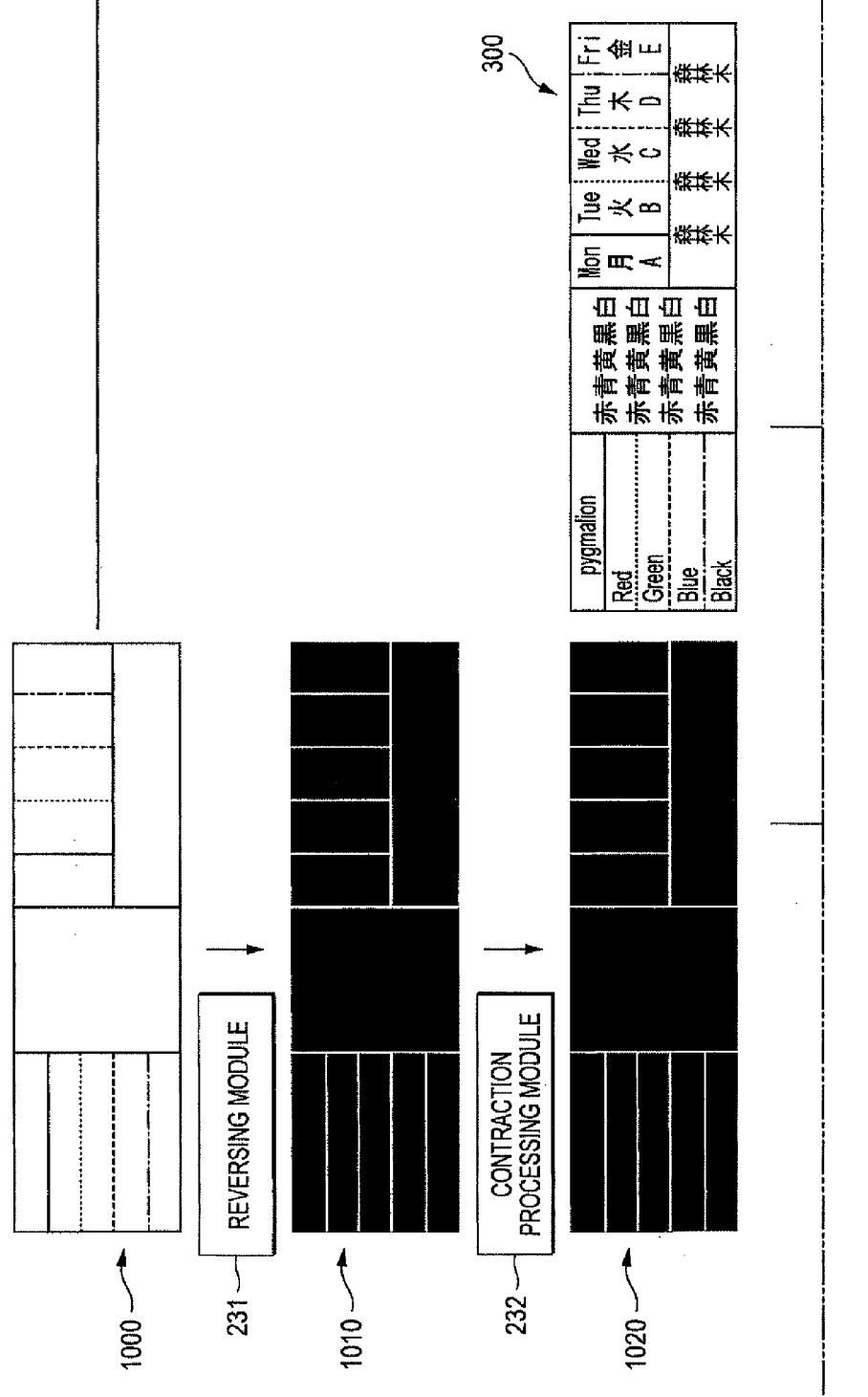

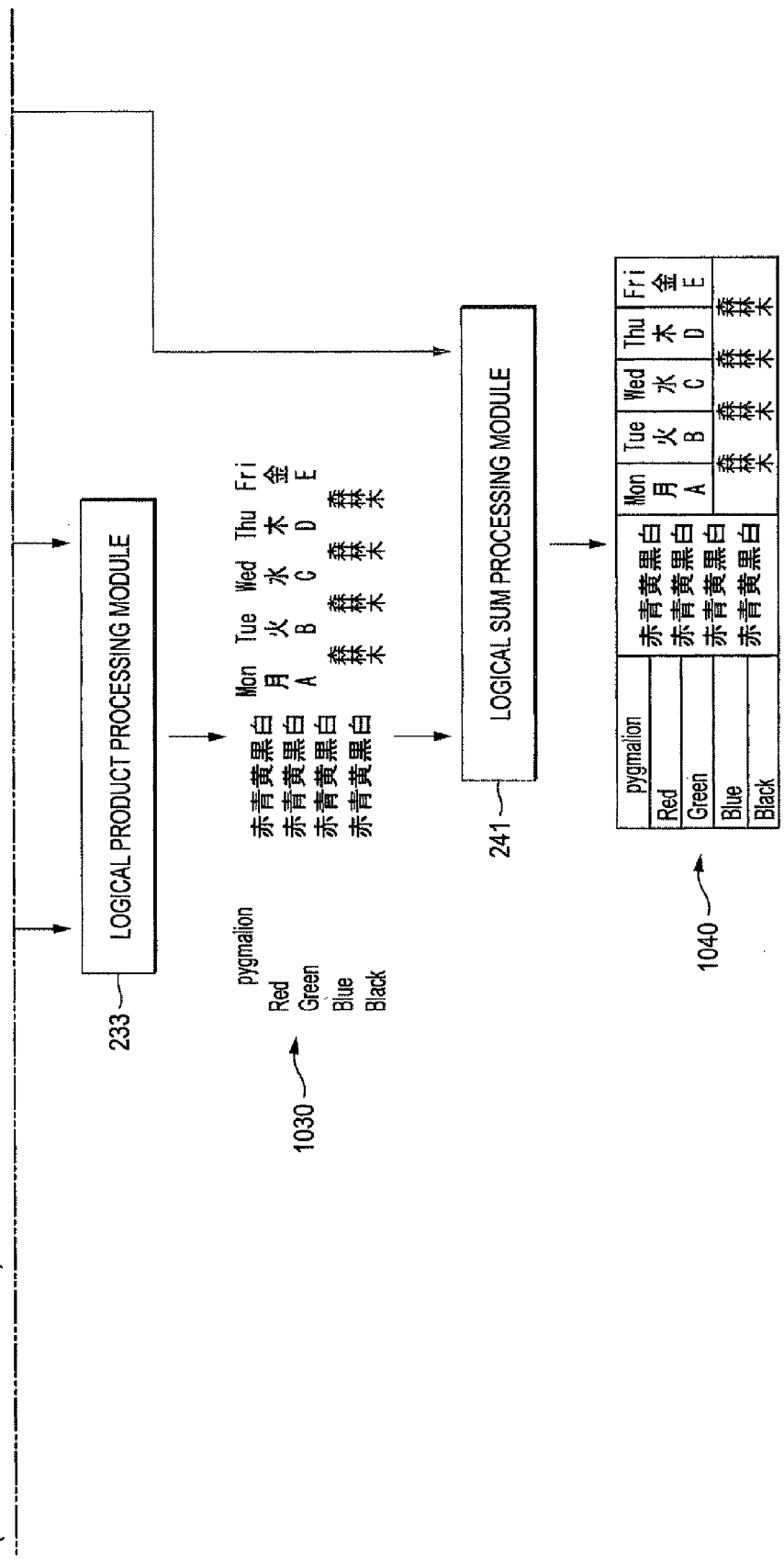
(FIG. 11 CONTINUED)

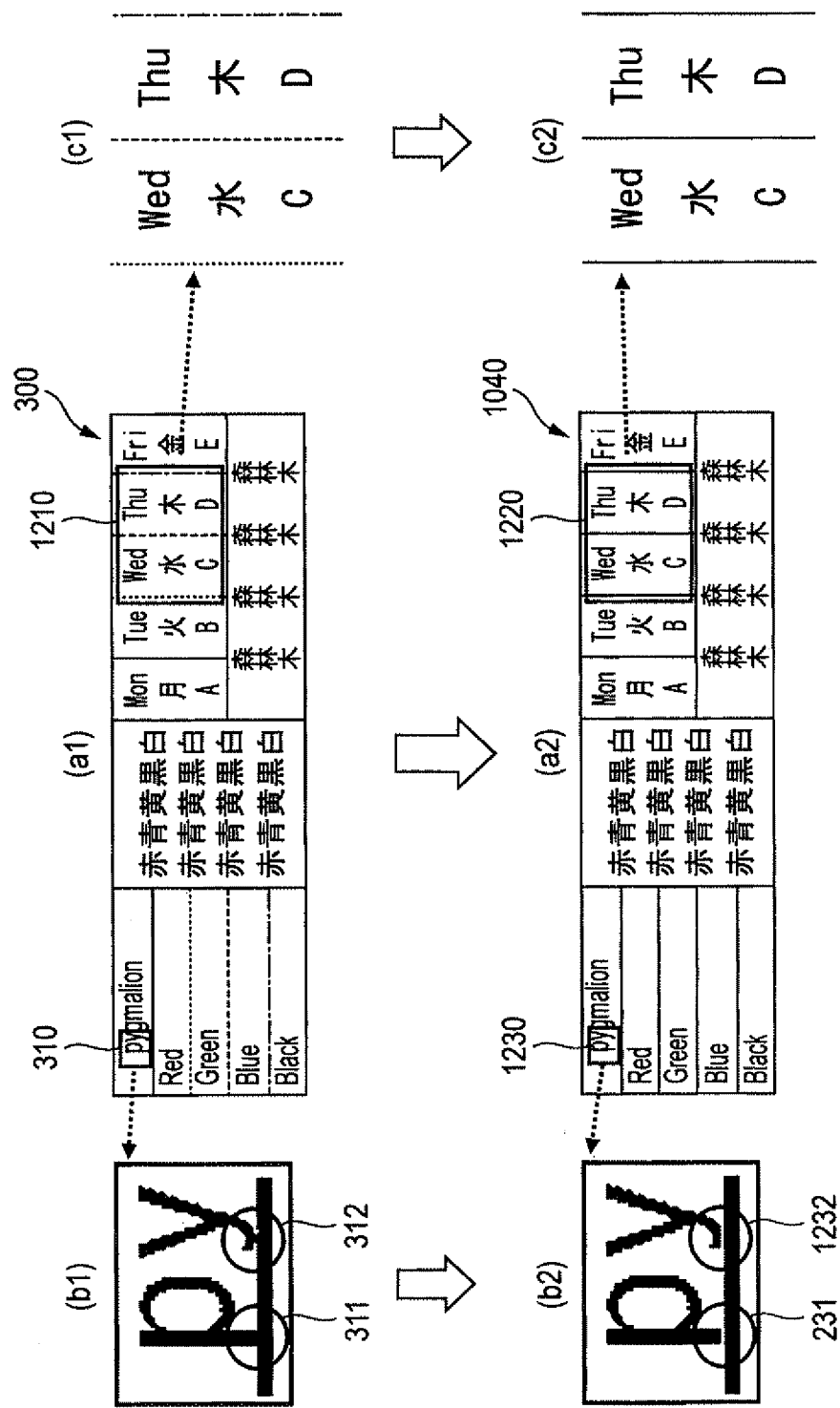

APPARATUS, METHOD AND COMPUTER READABLE MEDIUM FOR PERFORMING SOLID-LINE CONVERSION FROM LINES HAVING BREAKS

CROSS-REFERENCE TO RELATED APPLICATIONS

This application is based on and claims priority under 35 USC 119 from Japanese Patent Application No. 2009-212684 filed on Sep. 15, 2009.

BACKGROUND

1. Technical Field

The present invention relates to an image processing apparatus and an image processing program.

2. Related Art

Image processing is performed frequently on a document including tables and the like containing lines having breaks such as dotted lines.

SUMMARY

According to an aspect of the invention, an image processing apparatus includes an image receiving section, a succession value image generating section and a solid converting section. The image receiving section receives an image contains a line having breaks. The succession value image generating section generates a succession value image having as a pixel value the number of times of succession of black or white pixels in the image received by the image receiving section. The solid-line converting section, based on the succession value image generated by the succession value image generating section, performs solid-line conversion in which the line having breaks is changed into a solid line.

BRIEF DESCRIPTION OF THE DRAWINGS

Exemplary embodiment(s) of the present invention will be described in detail based on the following figures, wherein:

FIGS. 3A, 3B and 3C are explanation diagrams for showing an example of a received image;

FIGS. 4A and 4B are explanation diagrams for showing an example of a white run map image;

FIGS. 5A and 5B are explanation diagrams for showing an example of a property of a white run map image;

FIG. 8 is an explanation diagram showing an example of processing performed by a logical sum processing module V and the like;

FIGS. 9A and 9B are explanation diagrams for showing an example of processing performed by a black run map image generating module H and the like;

FIG. 10 is an explanation diagram showing an example of processing performed by a logical sum processing module;

FIG. 11 is an explanation diagram showing an example of processing performed by a reversing module and the like;

FIG. 12 is an explanation diagram showing an example of processing according to a first exemplary embodiment;

DETAILED DESCRIPTION

Examples of various kinds of exemplary embodiments for implementing the present invention are described below with reference to the drawings. In the exemplary embodiments, some figures (FIGS. 3A and 8, etc.) contain Japanese characters. Characters in any other languages may be shown in these figures. In other word, these figures show images containing any languages could be applied to the present invention.

Figure 1:
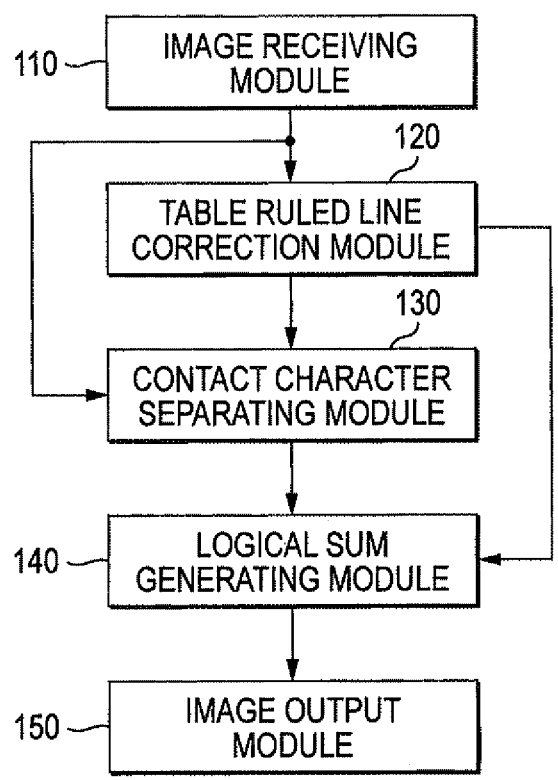
FIG. 1 is a conceptual module configuration diagram for an exemplary configuration according to a first exemplary embodiment.

FIG. 1 is a conceptual module configuration diagram for an exemplary configuration according to a first exemplary embodiment.

Here, the term "module" indicates a component of software (a computer program), hardware, or the like which is logically separable from other parts in general. Thus, a module in the present exemplary embodiment indicates not only a module in a computer program but also a module in a hardware configuration. Accordingly, the present exemplary embodiment serves also as descriptions of a computer program, a system, and a method. Here, for simplicity of description, the expressions "to store" and "to cause something to store" and other equivalent expressions are used. Then, in an exemplary embodiment of a computer program, these expressions indicate "to store into a storage device", "to perform control such as to cause to store into a storage device", and the like. Further, each module may be in one-to-one correspondence to a function. However, in actual implementation, one module may be constructed from a single program. Alternatively, a plurality of modules may be constructed from a single program. In contrast, a single module may be constructed from a plurality of programs. Further, a plurality of modules may be executed by a single computer. Alternatively, a single module may be executed by a plurality of computers in a distributed or parallel computing environment. Here, a module may contain another module. Further, in the following description, the term "connection" indicates a physical connection as well as a logical connection (data transfer, instructions, and reference relations between data, and the like).

Further, the terms "system" and "apparatus" indicate a configuration constructed by connecting a plurality of computers, hardware pieces, apparatuses, and the like through communication means such as a network (including a communication connection of one-to-one correspondence), as well as a configuration implemented by a single computer, hardware piece, apparatus, or the like. These terms "apparatus" and "system" are used as synonymous terms to each other. Obviously, the "system" does not include a social "mechanism" (social system) which is based on a human agreement. The expression "defined in advance" indicates that something is defined before a processing of interest. This includes timing before the stat of the entire processing according to the present exemplary embodiment, as well as timing even after the start of processing according to the present exemplary embodiment as long as it is before the start of a particular processing piece of interest. That is, the expression indicates that something is defined in accordance with a situation or a state at that time, or alternatively in accordance with a situation and a state until that time.

As illustrated in FIG. 1, the image processing apparatus according to the first exemplary embodiment has an image receiving module 110, a table ruled line correction module 120, a contact character separating module 130, a logical sum generating module 140, and an image output module 150.

The image receiving module 110 is connected to the table ruled line correction module 120 and the contact character separating module 130, and receives an image and then transfers the image to the table ruled line correction module 120 and the contact character separating module 130. The expression "to receive an image" indicates, for example, "to read an image through a scanner, a camera, or the like", "to receive an image from an external device through a facsimile or the like via a communication line", and "to read an image stored in a hard disk (one built in a computer or alternatively one connected via a communication line) or the like". Here, the received image is a binary image. However, a multi-valued image (including a color image) may be employed. In the case of a multi-valued image, binarization is performed. Further, a single image or a plurality of images may be received. Furthermore, as the contents of the image may be a business document, a sheet form, a pamphlet for advertisement, or the like as long as ruled lines constituting a table or the like are contained. Further, the ruled lines may include a line having breaks. Alternatively, a pixel group may be in contact with a ruled line.

Here, the line having breaks indicates a line other than a solid line, like a dotted line, a dashed line, a dash-dotted line, a double-doted dashed line, and a combination of these. Such a line is generically referred to as a dotted line, hereinafter.

Further, the pixel group indicates an object that is other than a ruled line and that contains at least a region of four or eight connected pixels. The pixel group includes also a set of such pixel regions. The set of pixel regions indicates a set such that a plurality of pixel regions in each of which four pixels or the like are connected and that these pixel regions are located in the neighborhood to each other. Here, the neighborhood indicates a situation that the pixel regions are located near to each other in terms of physical distance, or alternatively indicates an image region obtained by extracting a character from each line of the text and then projecting them in the horizontal or vertical direction so as to cut out them at a blank position or an image region cut out at intervals defined in advance.

Here, one pixel group is constructed from the image of one character, in many cases. However, the pixel group need not be a pixel region recognized as an actual character by a person, and may be a part of a character, a pixel region that does not constitute a character, and any other pixel group.

Further, the ruled line is black in general. However, any white ruled line may be employed, although the following description is given mainly for the case of a black ruled line.

The table ruled line correction module 120 is connected to the image receiving module 110, the contact character separating module 130, and the logical sum generating module 140, and generates a succession value image having as a pixel value the number of times of succession of black or white pixels in the image received by the image receiving module 110. Then, based on the generated succession value image, the table ruled line correction module 120 performs solid-line conversion in which a line having breaks is changed into a solid line. Then, the image in which each line having breaks has been converted into a solid line is transferred to the contact character separating module 130 and the logical sum generating module 140. Alternatively, an image of solid-line converted ruled lines alone may be transferred to the contact character separating module 130 and the like. That is, an image obtained by extracting ruled lines alone (that is, removing pixel groups) from the image received by the image receiving module 110 may be transferred.

For example, a configuration may be employed that based on comparison with a first threshold value defined in advance, the table ruled line correction module 120 adopts, as two ends, two first pixels extracted from the pixels in the succession value image, and then when a pixel between the first pixels is of a second pixel extracted based on comparison with a second threshold value defined in advance, determines the second pixel to be a break in the line having breaks, so as to perform solid-line conversion. Here, details of the configuration, the contents of processing, and the like of the table ruled line correction module 120 are described later with reference to FIG. 2 and the like.

The succession value image indicates an image having, as a pixel value, the number of times of succession (a so-called run length) of pixels of the same color as that of a pixel of interest, in the horizontal or vertical direction. In other words, each pixel constituting a run length has a pixel value equal to the run length value. Thus, the pixels within a run length have the same pixel value. Hereinafter, the succession value image is referred to as a run map image, in some cases. Such an image based on the run length of black pixels is referred to as a black run map image, and while an image based on the run length of white pixels is referred to as a white run map image.

The run map image has the same size (width×height) as the image received by the image receiving module 110. However, although the image received by the image receiving module 110 is a binary image, the run map image is a multi-valued image in which each pixel expresses the number of times of succession. For example, 8 bit/pixel may be adopted. In this case, when the number of times of succession is greater than or equal to 256, the pixel value may be fixed to be 255.

Further, the solid-line conversion indicates that a line having breaks is changed into a solid line. Specifically, a line having breaks is connected (blank parts between short line segments are filled) so that a solid line is generated.

The contact character separating module 130 is connected to the image receiving module 110, the table ruled line correction module 120, and the logical sum generating module 140. Based on an image generated based on the line generated by solid-line conversion in the table ruled line correction module 120, the contact character separating module 130 separates a pixel group that is in contact with a solid line or a line having breaks within the image received by the image receiving module 110. Specifically, for example, an image composed of ruled lines alone undergoes reversing (processing of changing white pixels into black pixels and black pixels into white pixels). Then, the reversed image undergoes contraction. Then, logical product processing is performed between the image obtained by reversing and contraction and the image received by the image receiving module 110, so that the pixel group in contact is separated from a ruled line composed of a solid line or a line having breaks. Then, the image containing only objects other than a ruled line (the image composed of characters alone) is transferred to the logical sum generating module 140. Here, details of the configuration, the contents of processing, and the like of the contact character separating module 130 are described later with reference to FIG. 2 and the like.

The logical sum generating module 140 is connected to the table ruled line correction module 120, the contact character separating module 130, and the image output module 150. The logical sum generating module 140 receives: the image composed of ruled lines alone that is generated by solid-line conversion of lines having breaks and obtained from the table ruled line correction module 120; and the image composed of objects other than ruled lines that is generated by separating each pixel group in contact with a ruled line and obtained from the contact character separating module 130. Then, the logical sum generating module 140 performs logical sum operation on these images so as to generates an image in which each line having breaks has been converted into a solid line and each pixel group in contact with a ruled line is separated. Then, the image is transferred to the image output module 150. Here, details of the configuration, the contents of processing, and the like of the logical sum generating module 140 are described later with reference to FIG. 2 and the like.

The image output module 150 is connected to the logical sum generating module 140, and receives an image generated by the logical sum generating module 140 and then outputs the image. The expression "to output an image" includes "to print data through a printing apparatus such as a printer", "to display data onto a display apparatus such as a display device", "to transmit an image through an image transmitting apparatus such as a facsimile machine", "to write an image into an image storage device such as an image database", "to store data into a storage medium such as a memory card", and "to transfer data to another information processing apparatus". Further, the image output module 150 may output an image to an optical character reader, and then the optical character reader may recognize and convert the image into a document in XML (eXtensible Markup Language) or the like.

Figure 2:
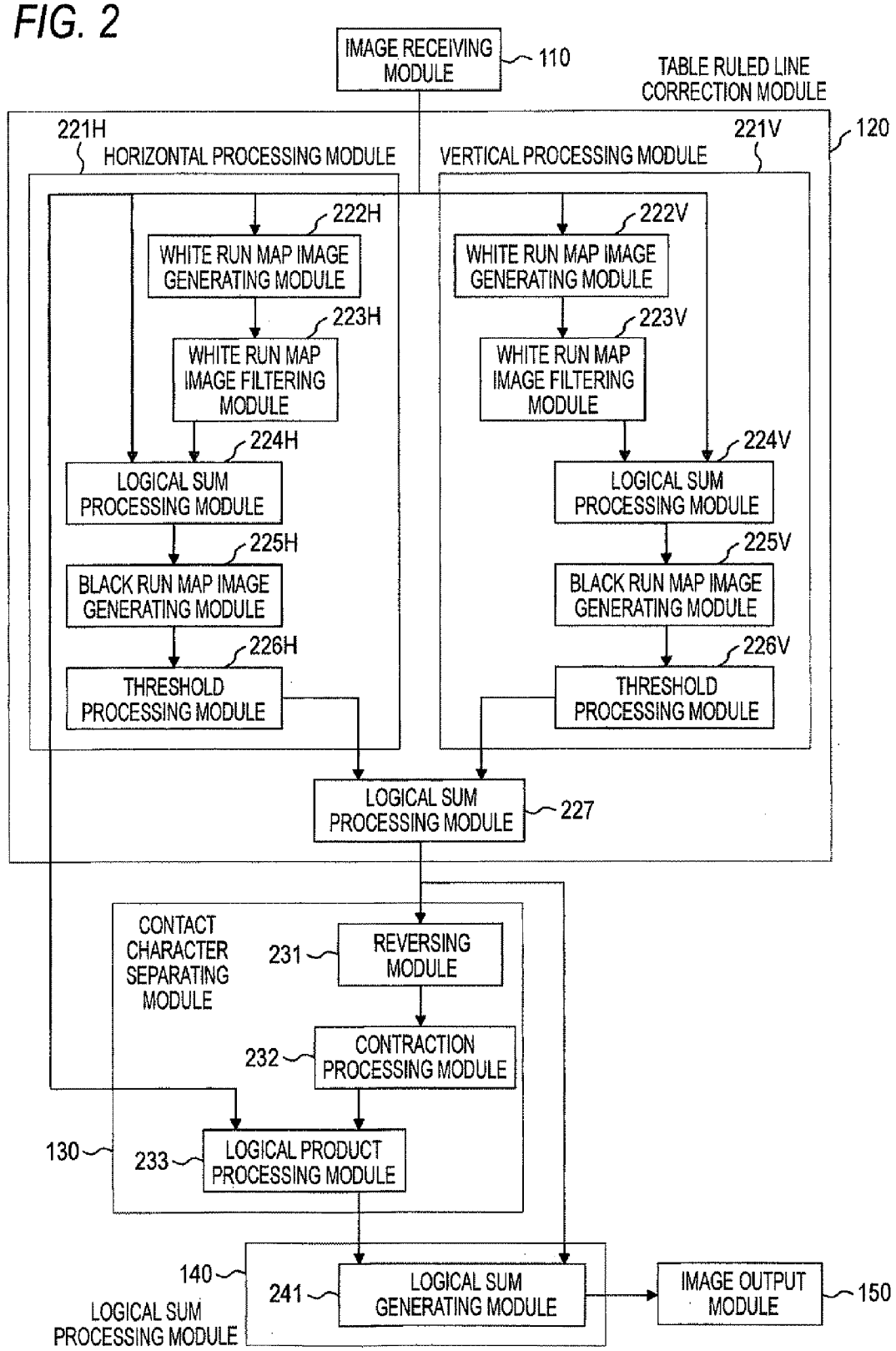
FIG. 2 is a detailed module configuration diagram for an exemplary configuration according to a first exemplary embodiment.

FIG. 2 is a detailed module configuration diagram for an exemplary configuration according to the first exemplary embodiment.

The image receiving module 110 is connected to the white run map image generating module 222H, the logical sum processing module 224H, the white run map image generating module 222V, the logical sum processing module 224V, and the logical product processing module 233. An example of a received image is the received image 300 illustrated in FIG. 3A. As in the region 310 within the received image 300, contact occurring regions 311 and 312 arise where a character and a ruled line are in contact with each other (see FIG. 3B). Further, as in the region 320 within the received image 300, a ruled line other than a solid line 321 may be a dotted line 322, a dashed line 323, a dash-dotted line 324, or the like (see FIG. 3C).

The table ruled line correction module 120 has a horizontal processing module 221H, a vertical processing module 221V, and a logical sum processing module 227. The horizontal processing module 221H has a white run map image generating module 222H, a white run map filtering module 223H, a logical sum processing module 224H, a black run map image generating module 225H, and a threshold processing module 226H. The vertical processing module 221V has a white run map image generating module 222V, a white run map filtering module 223V, a logical sum processing module 224V, a black run map image generating module 225V, and a threshold processing module 226V. The horizontal processing module 221H performs horizontal processing (the processing of extracting a horizontal ruled line) onto the image received by the image receiving module 110, while the vertical processing module 221V performs vertical processing (the processing of extracting a vertical ruled line) onto the image received by the image receiving module 110. These modules are different from each other in the point that horizontal and vertical ruled lines are processed respectively. However, when the image is interpreted as being rotated by 90 degrees, these modules perform conceptually the same processing. Thus, these modules respectively have corresponding sub-modules. The following description is given for any one of these modules or alternatively for a situation of unification of these.

The white run map image generating module 222 is connected to the image receiving module 110 and the white run map filtering module 223, and generates a white run map image based on the image received from the image receiving module 110. Then, the generated white run map image is transferred to the white run map filtering module 223.

For example, specifically, a white pixel in the image is specified as a pixel of interest. Then, the run length of each white pixel (the number of horizontally successive white pixels in the case of processing by the white run map image generating module 222H, and the number of vertically successive white pixels in the processing by the white run map image generating module 222V) is counted. Then, the run length value is imparted as the pixel value to each white pixel belonging to the run length. More specifically, when the run length value of a particular group of white pixels is 10, the pixel value of each of the ten white pixels belonging to the group is set to be 10.

FIGS. 4A and 4B are explanation diagrams for showing an example of a white run map image. The white run map image 410 illustrated in FIG. 4A is one generated by the white run map image generating module 222H, while the white run map image 420 illustrated in FIG. 4B is one generated by the white run map image generating module 222V. In these figures, a darker pixel having a greater white run length value. That is, a longer white run length is shown darker. Here, the run length value exceeding 255 is truncated into 255.

The white run map filtering module 223 is connected to the white run map image generating module 222 and the logical sum processing module 224, and performs filtering on the white run map image received from the white run map image generating module 222. Then, the result of filtering processing is transferred to the logical sum processing module 224.

Here, the property of the white run map image is described below with reference to examples shown in FIGS. 5A, 5B, 6A and 6B.

Figure 6A:
FIGS. 6A and 6B are explanation diagrams for showing an example of a property of a white run map image.
Figure 6B:

The example of a white run map image shown in FIG. 53 is obtained by the white run map image generating module 222V processing the character image illustrated in FIG. 5A. The example of a white run map image shown in FIG. 6B is obtained by the white run map image generating module 222V processing the dotted line image illustrated in FIG. 6A. As such, a character pixel adjacent region has relatively short white run pixels in many cases, while a dotted line adjacent region has relatively long white run length pixels, in many cases. The white run map filtering module 223 utilizes this property.

Figure 7A:
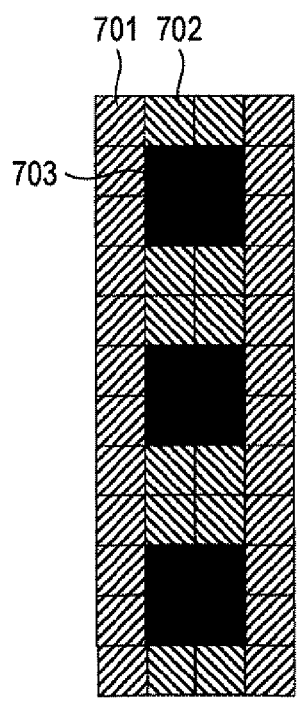
FIGS. 7A and 7B are explanation diagrams for showing an example of processing performed by a white run map filtering module V.
Figure 7B:
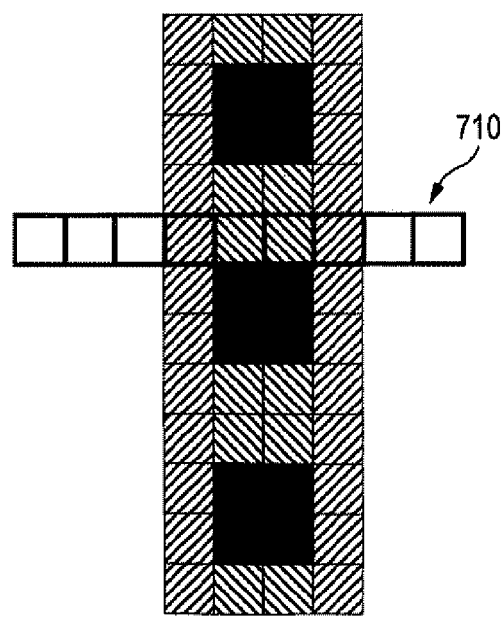

FIGS. 7A and 7B are explanation diagrams for showing an example of processing performed by the white run map filtering module 223V. The image illustrated in FIG. 7A is an image of a dotted line that has a two-pixel width and alternates black and white at two-pixel intervals. This image has the following properties.

(1) Long white run lengths are present on the sides of the dotted line. In the example shown in FIG. 7A, the pixels (squares shaded with lines inclined from the upper right to the lower left, like the pixel 701) located at the two ends constitute a long white run length.

(2) White pixels that constitute the dotted line are short. In the example shown in FIG. 7A, white pixels (squares shaded with lines inclined from the upper left to the lower right, like the pixel 702) located between black pixels (such as the pixel 703) constituting the dotted line constitute a short white run length.

By using a horizontal 9×1-pixel filter (the filter 710 illustrated in FIG. 7B), the white run map filtering module 223V detects white pixels constituting the dotted line. That is, for the white run map image, among the pixels within the filter 710, pixels B having a short white run length located between pixels A having a long white run length are outputted as black pixels (ON). Other pixels are outputted as white pixels (OFF).

The pixel A having a long white run length indicates a pixel having a pixel value greater than a threshold value (Th_w) defined in advance. The pixel B having a short white run length indicates a pixel having a pixel value is smaller than a threshold value (Th_s) defined in advance.

As a result of this filtering, a binary image is generated in which only white pixels constituting a dotted line are set ON and the other pixels (characters and solid lines) are set OFF.

Further, the white run map filtering module 223H also performs similar filtering processing by using a vertical 1×9-pixel filter.

Here, the size of the filter may be variable in accordance with the width of a dotted line to be detected. The above-mentioned 9×1-pixel filter can detect a dotted line of up to seven pixels.

The logical sum processing module 224 is connected to the image receiving module 110, the white run map filtering module 223, and the black run map image generating module 225. The logical sum processing module 224 performs logical sum processing between the image received from the image receiving module 110 and the white run map image received from the white run map filtering module 223, so as to generate an image in which each dotted line has been converted into a solid line. Then, the generated image is transferred to the black run map image generating module 225.

Figure 8:
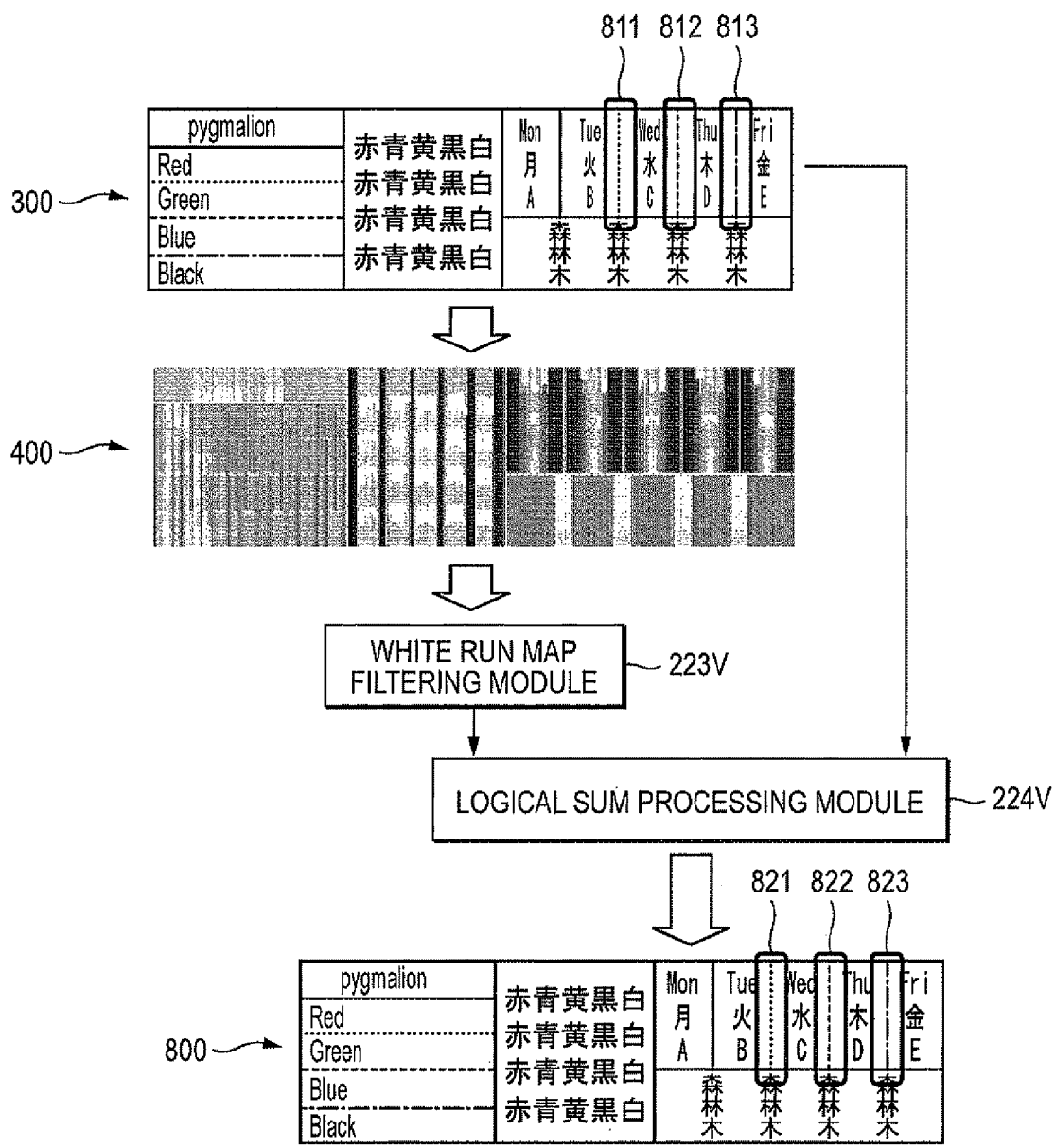

FIG. 8 is an explanation diagram showing an example of processing performed by the logical sum processing module 224V and the like. The received image 300 is an image received by the image receiving module 110, and has a dotted line, a dashed line, and a dash-dotted line in the regions 811, 812, and 813, respectively. The white run map image 420 is a white run map image generated by the white run map image generating module 222V. From this the white run map image 420, the white run map filtering module 223V generates a binary image in which white pixels constituting a dotted line are set ON and the other pixels are ser OFF. The solid-line converted image (vertical) 800 is an image generated by the logical sum processing module 224V, in which the dotted line and the like in the regions 821, 822, and 823 corresponding to the regions 811, 812, and 813 have been converted into solid lines.

The black run map image generating module 225 is connected to the logical sum processing module 224 and the threshold processing module 226, and generates a black run map image based on the image (in which each dotted line has been converted into a solid line) received from the logical sum processing module 224. Then, the generated black run map image is transferred to the threshold processing module 226. The generation of the black run map image is similar to the generation of the white run map image by the white run map image generating module 222. That is, a black pixel in the image is specified as a pixel of interest. Then, the run length of each black pixel (the number of horizontally successive black pixels in the case of processing by the black run map image generating module 225H, and the number of vertically successive black pixels in the processing by the black run map image generating module 225V) is counted. Then, the run length value is imparted as the pixel value to each black pixel belonging to the run length.

The threshold processing module 226 is connected to the black run map image generating module 225 and the logical sum processing module 227, and performs threshold processing onto each pixel in the black run map image received from the black run map image generating module 225. Then, the image having undergone the threshold processing is transferred to the logical sum processing module 227. Here, in the threshold processing, the pixel value of each pixel is compared with a threshold defined in advance, and then pixels having a value greater than or equal to a threshold defined in advance are extracted as pixels constituting a ruled line. As a result, a ruled line having a value greater than or equal to the threshold remains, while a ruled line having a value smaller than the threshold is removed.

Figure 9A:
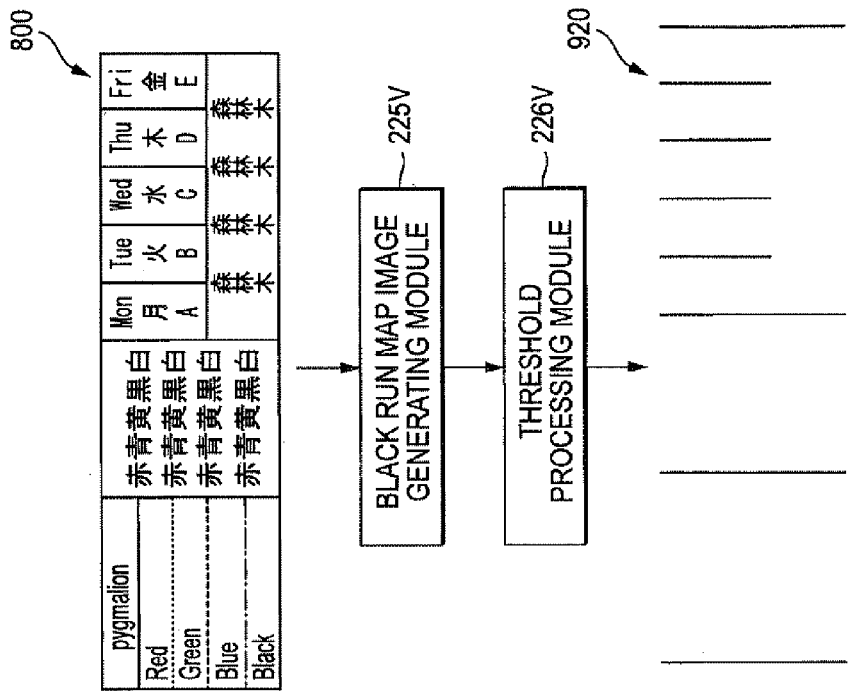
Figure 9B:
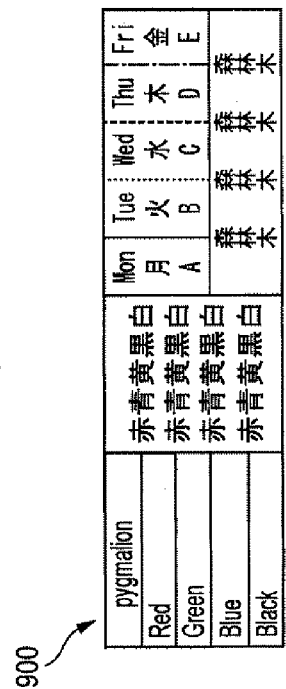

FIGS. 9A and 9B are explanation diagrams for showing an example of processing performed by the black run map image generating module 225 and the threshold processing module 226.

The solid-line converted image (horizontal) 900 illustrated in FIG. 9A is an output image from the logical sum processing module 224H. Then, as a result of processing performed on the solid-line converted image (horizontal) 900 by the black run map image generating module 225H and the threshold processing module 226H, a horizontal ruled line image 910 is obtained. As such, from an image in which each horizontal dotted line has been converted into a solid line, horizontal ruled lines having a value greater than or equal to a threshold are extracted solely.

Also onto the solid-line converted image (vertical) 800 illustrated in FIG. 9B, similar processing is performed by the black run map image generating module 225V and the threshold processing module 226V, so that a vertical ruled line image 920 obtained.

The logical sum processing module 227 is connected to the threshold processing module 226H, the threshold processing module 226V, the reversing module 231, and the logical sum processing module 241. The logical sum processing module 227 receives from the threshold processing module 226H the image composed of horizontal ruled lines alone, then receives from the threshold processing module 226V the image composed of vertical ruled lines alone, and then generates the logical sum of the two images. Then, the image obtained by the logical sum operation is transferred to the reversing module 231 and the logical sum processing module 241.

FIG. 10 is an explanation diagram showing an example of processing performed by the logical sum processing module 227. The logical sum processing module 227 receives the horizontal ruled line image 910 from the threshold processing module 226H and the vertical ruled line image 920 from the threshold processing module 226V, and then generates the logical sum of the two images so as to obtain a ruled line image 1000.

The contact character separating module 130 has the reversing module 231, the contraction processing module 232, and the logical product processing module 233.

The reversing module 231 is connected to the logical sum processing module 227 and the contraction processing module 232, and receives the image composed of ruled lines alone from the logical sum processing module 227 and then performs reversing processing (logical negation processing). Then, the reversed image is transferred to the contraction processing module 232.

The contraction processing module 232 is connected to the reversing module 231 and the logical product processing module 233, and receives the reversed image from the reversing module 231 and then performs contraction processing. Then, the contracted image is transferred to the logical product processing module 233. Here, in the contraction processing, the value of each pixel on the boundary of a black area is converted into the value of a white pixel of background component so that the black area is contracted by one or more pixels. For example, a logical product may be generated between the original image and an image obtained by shifting the original image by one pixel. Alternatively, any conventionally known contraction processing may be employed. As a result, an image used for separating a character in contact with a ruled line is obtained.

The logical product processing module 233 is connected to the image receiving module 110, the contraction processing module 232, and the logical sum processing module 241, and receives the image from the image receiving module 110 and the contracted image from the contraction processing module 232, and then generates their logical product. Then, the image obtained by the logical product processing is transferred to the logical sum processing module 241. As a result, an image composed of characters alone other than a ruled line is obtained. Further, in each character having had been in contact with a ruled line, the contact part is removed.

The logical sum generating module 140 has the logical sum processing module 241.

The logical sum processing module 241 is connected to the logical sum processing module 227, the logical product processing module 233, and the image output module 150, and receives from the logical sum processing module 227 the image (containing ruled lines alone) obtained by logical sum processing, receives from the logical product processing module 233 the image (containing characters alone) obtained by logical product processing, and then generates their logical sum. Then, the image obtained by the logical sum processing is transferred to the image output module 150.

FIG. 11 is an explanation diagram showing an example of processing performed by the reversing module 231, the contraction processing module 232, the logical product processing module 233, and the logical sum processing module 241. As shown in the figure, the reversing module 231 performs reversing processing onto ruled line image 1000 so as to generate a reversed image 1010. Then, the contraction processing module 232 performs contraction processing onto the reversed image 1010 so as to generate a mask 1020 for contact character separation. The logical product processing module 233 generates a logical product between the received image 300 and the mask 1020 for contact character separation so as to generate a character image 1030. The logical sum processing module 241 generates a logical sum between the ruled line image 1000 and the character image 1030 so as to generate an output image 1040.

The image output module 150 is connected to the logical sum processing module 241, and receives from the logical sum processing module 241 the image in which each dotted line has been converted into a solid line and in which each character in contact with a ruled line has been separated. Then, the image output module 150 outputs the image.

FIG. 12 is an explanation diagram showing an example of processing according to the first exemplary embodiment. The received image 300 illustrated in Part (a1) of FIG. 12 is an example of an image received by the image receiving module 110. In this example, as illustrated in Part (a1) of FIG. 12, the region 310 has characters in contact with a ruled line respectively in the contact occurring regions 311 and 312. Further, as illustrated in Part (c1) of FIG. 12, the region 1210 has a dotted line, a dashed line, and a dash-dotted line. The output image 1040 illustrated in Part (a2) of FIG. 12 is an example of an image outputted from the image output module 150. In this example, in the region 1230 having had contact characters, separation has been achieved in the contact parts (the separation regions 1231 and 1232) as illustrated in Part (b2) of FIG. 12. Further, in the region 1220 having contained a dotted line, a dashed line, and a dash-dotted line, these lines have been converted into solid lines as illustrated in Part (c2) of FIG. 12.

Figure 13:
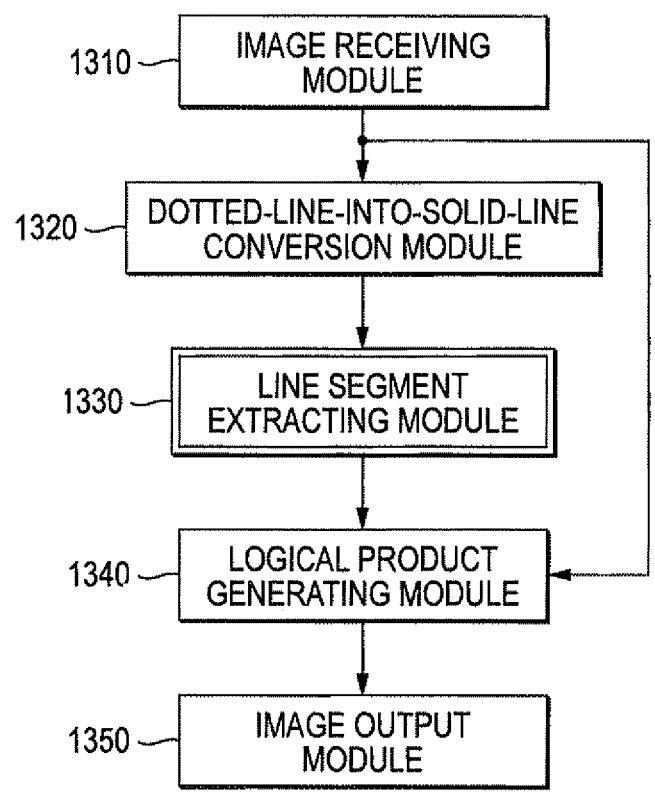
FIG. 13 is a conceptual module configuration diagram for an exemplary configuration according to a second exemplary embodiment.

FIG. 13 is a conceptual module configuration diagram for an exemplary configuration according to a second exemplary embodiment. As illustrated in FIG. 13, the image processing apparatus according to the second exemplary embodiment has an image receiving module 1310, a dotted-line-into-solid-line conversion module 1320, a line segment extracting module 1330, a logical product generating module 1340, and an image output module 1350.

In the second exemplary embodiment, characters are deleted from a received image so that an image composed of ruled lines alone is generated. As a difference from the first exemplary embodiment, dotted lines are not converted into solid lines in the outputted image. This exemplary embodiment is utilized, for example, in a case that a form image (a prototype document before filled with characters) is to be recognized.

The image receiving module 1310 is connected to the dotted-line-into-solid-line conversion module 1320 and the logical product generating module 1340. The image receiving module 1310 is equivalent to the image receiving module 110 illustrated in FIG. 1, and transfers the received image to the dotted-line-into-solid-line conversion module 1320 and the logical product generating module 1340.

The dotted-line-into-solid-line conversion module 1320 is connected to the image receiving module 1310 and the line segment extracting module 1330, and converts into a solid line each dotted line in the image received by the image receiving module 1310. That is, the dotted-line-into-solid-line conversion module 1320 performs processing similar to a first half part of the processing performed by the table ruled line correction module 120 illustrated in FIG. 1. Here, details of the configuration, the contents of processing, and the like of the dotted-line-into-solid-line conversion module 1320 are described later with reference to FIG. 14 and the like.

The line segment extracting module 1330 is connected to the dotted-line-into-solid-line conversion module 1320 and the logical product generating module 1340, and extracts a line segment serving as a ruled line from the solid-line converted image obtained by the dotted-line-into-solid-line conversion module 1320. Then, the image composed of ruled lines alone is transferred to the logical product generating module 1340.

Specifically, for example, from the image having undergone solid-line conversion in the dotted-line-into-solid-line conversion module 1320, a white run map image and a black run map image are generated. Then, based on the white run map image and the black run map image having been generated, a line segment is extracted from the image received by the image receiving module 1310. Here, details of the configuration, the contents of processing, and the like of the line segment extracting module 1330 are described later with reference to FIG. 14 and the like.

The logical product generating module 1340 is connected to the image receiving module 1310, the line segment extracting module 1330, and the image output module 1350, and generates a logical product between the image composed of ruled lines alone generated by the line segment extracting module 1330 and the image received by the image receiving module 1310 so as to delete characters from the document and hence obtain an image composed of ruled lines alone. Here, details of the configuration, the contents of processing, and the like of the logical product generating module 1340 are described later with reference to FIG. 14 and the like.

The image output module 1350 is connected to the logical product generating module 1340. The image output module 1350 is equivalent to the image output module 150 illustrated in FIG. 1, and outputs the image received from the logical product generating module 1340. For example, the image may be outputted to a form recognition processing apparatus, and then the form recognition processing apparatus may recognize the image and then perform processing in accordance with the type of the form. Alternatively, the image may be outputted to a table analysis processing apparatus, and then the table analysis processing apparatus may perform analysis processing of the table constructed from ruled lines.

Figure 14:
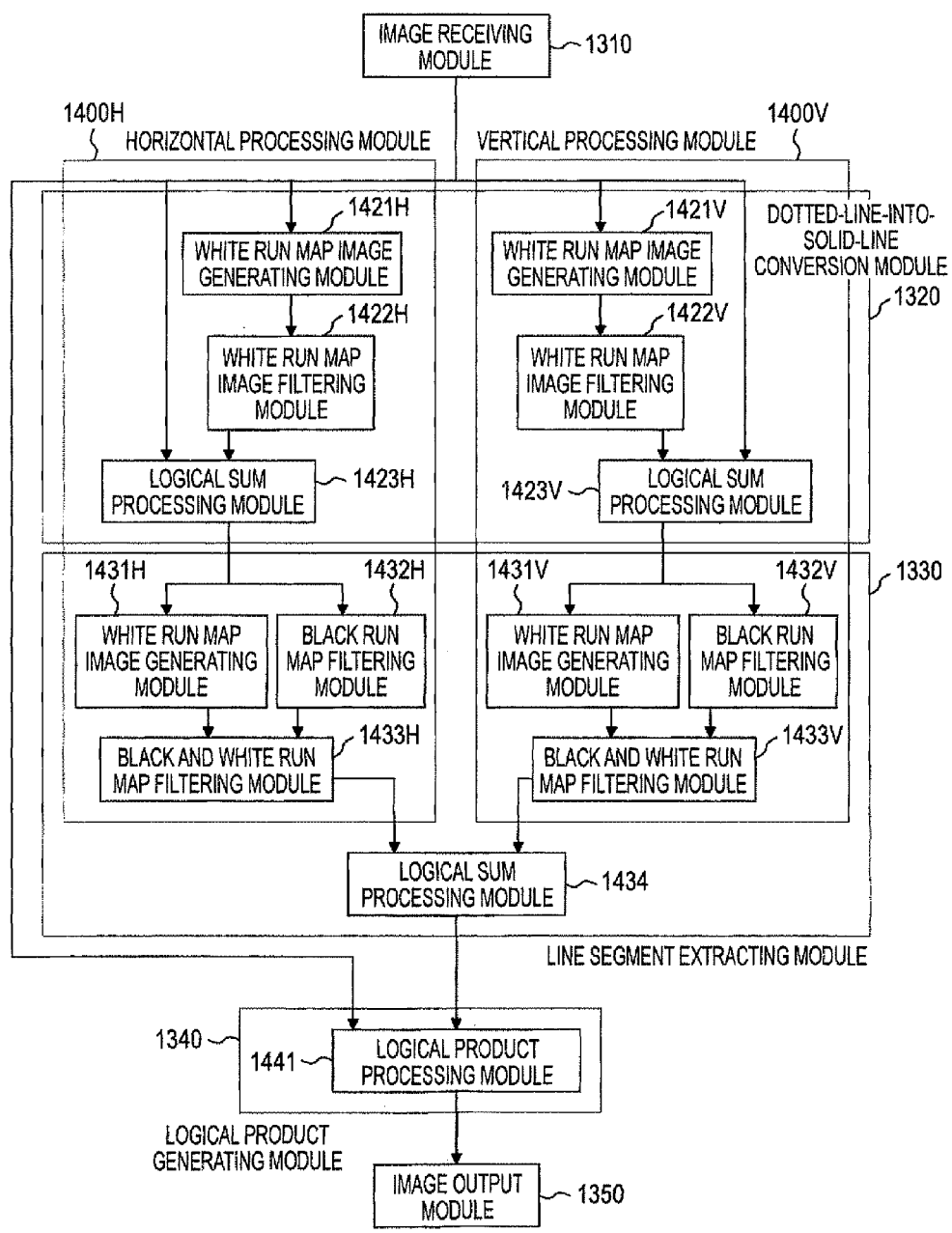
FIG. 14 is a detailed module configuration diagram for an exemplary configuration according to a second exemplary embodiment.

FIG. 14 is a detailed module configuration diagram for an exemplary configuration according to the second exemplary embodiment.

The image receiving module 1310 is connected to the white run map image generating module 1421H, the logical sum processing module 1423H, the white run map image generating module 1421V, the logical sum processing module 1423V, and the logical product processing module 1441. The image receiving module 1310 is equivalent to the image receiving module 110 illustrated in FIG. 2.

The dotted-line-into-solid-line conversion module 1320 is divided into a horizontal processing module 1400H and a vertical processing module 1400V. The horizontal processing module 1400H in the dotted-line-into-solid-line conversion module 1320 has a white run map image generating module 1421H, a white run map filtering module 1422H, and a logical sum processing module 1423H. The vertical processing module 1400V in the dotted-line-into-solid-line conversion module 1320 has a white run map image generating module 1421V, a white run map filtering module 1422V, and a logical sum processing module 1423V.

The line segment extracting module 1330 has a logical sum processing module 1434. The other modules are divided into those for the horizontal processing module 1400H and the vertical processing module 1400V. The horizontal processing module 1400H in the line segment extracting module 1330 has a white run map image generating module 1431H, a black run map filtering module 1432H, and a black and white run map filtering module 1433H. The vertical processing module 1400V in the line segment extracting module 1330 has a white run map image generating module 1431V, a black run map filtering module 1432V, and a black and white run map filtering module 1433V.

The horizontal processing module 1400H and the vertical processing module 1400V are different from each other in the point that horizontal and vertical ruled lines are processed respectively. However, these modules perform conceptually the same processing when the image is interpreted as being rotated by 90 degrees. Thus, equivalent corresponding submodules are employed. The following description is given for any one of these modules or alternatively for a situation of unification of these.

The white run map image generating module 1421, the white run map filtering module 1422, and the logical sum processing module 1423 in the dotted-line-into-solid-line conversion module 1320 are equivalent respectively to the white run map image generating module 222, the white run map filtering module 223, and the logical sum processing module 224 illustrated in FIG. 2.

The white run map image generating module 1431 is connected to the logical sum processing module 1423 and the black and white run map filtering module 1433, and generates a white run map image based on the image (in which each dotted line has been converted into a solid line) received from the logical sum processing module 1423. Then, the generated white run map image is transferred to the black and white run map filtering module 1433.

The black run map image generating module 1432 is connected to the logical sum processing module 1423 and the black and white run map filtering module 1433, and generates a black run map image based on the image (in which each dotted line has been converted into a solid line) received from the logical sum processing module 1423. Then, the generated black run map image is transferred to the black and white run map filtering module 1433.

The black and white run map filtering module 1433 is connected to the white run map image generating module 1431, the black run map image generating module 1432, and the logical sum processing module 1434. Based on the white run map image received from the white run map image generating module 1431 and the black run map image received from the black run map image generating module 1432, the black and white run map filtering module 1433 extracts a ruled line.

Figure 15A:
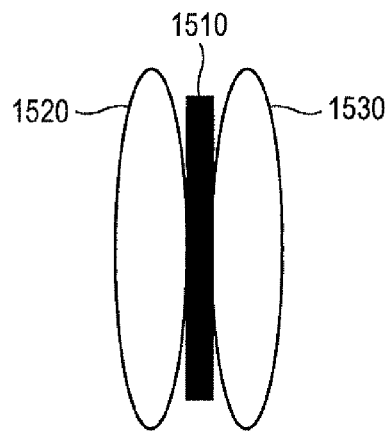
FIGS. 15A and 15B are explanation diagrams for showing an example of relation between a black run length and a white run length.
Figure 15B:
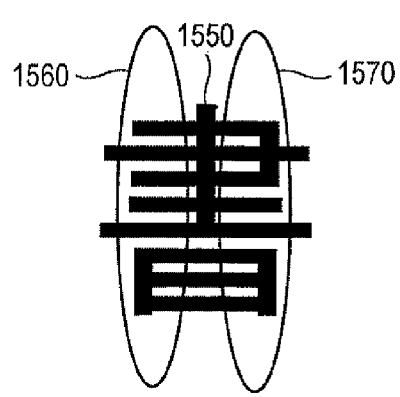

In an image composed of solid lines alone (including an image in which dotted lines have been converted into solid lines), a property is realized that "the length value of a white run length adjacent to a black run length of a character is shorter than that of a white run length adjacent to a black run length of a solid line". FIGS. 15A and 15B are explanation diagrams for showing an example of relation between a black run length and a white run length. As illustrated in FIG. 15B, the white run length values of the adjacent regions 1560 and 1570 in the character image 1550 are shorter than the white run length values of the adjacent regions 1520 and 1530 in the straight line image 1510 illustrated in FIG. 15A.

Figure 16A:
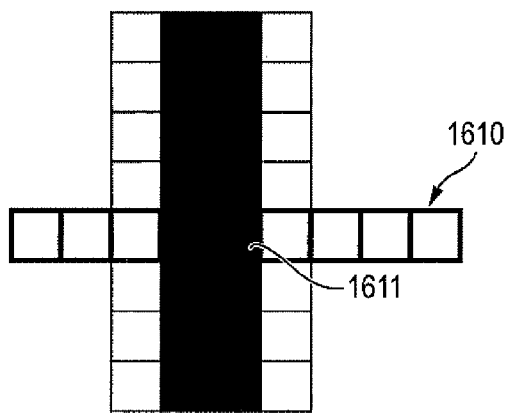
FIGS. 16A and 16B are explanation diagrams for showing an example of processing performed by a black and white run map filtering module V.
Figure 16B:
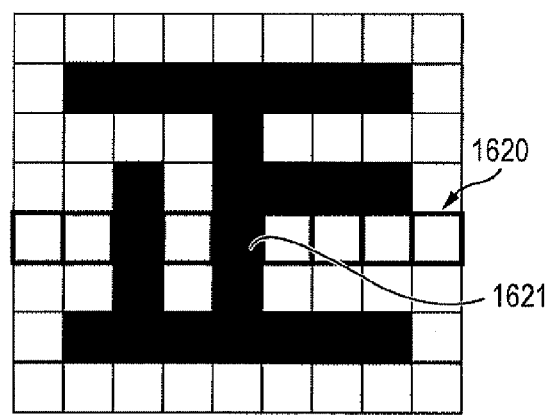

FIGS. 16A and 16B are explanation diagrams for showing an example of processing performed by the black and white run map filtering module 1433V. Based on the white run map image received from the white run map image generating module 1431V and the black run map image received from the black run map image generating module 1432V, the black and white run map filtering module 1433V performs filtering.

In the filtering described here, when the following four conditions are satisfied, a pixel of interest is outputted as a blackpixel (ON). Otherwise, the pixel of interest is outputted as a white pixel (OFF).

(1V) The pixel of interest located in the center of the horizontal 9×1-pixel filter (the filter 1610 or 1620 illustrated in FIG. 16A or 16B) is a black pixel.

(2V) The black run length value in the pixel of interest is greater than or equal to a threshold (TH_AV) defined in advance.

(3V) The white run length value of any one of the four pixels on the right-hand side of the pixel of interest is greater than or equal to a threshold (TH_BV) defined in advance.

(4V) The white run length value of any one of the four pixels on the left-hand side of the pixel of interest is greater than or equal to a threshold (TH_CV) defined in advance.

The conditions in the processing performed by the black and white run map filtering module 1433H are similar to the four conditions described above. That is, when the following four conditions are satisfied, a pixel of interest is outputted as a black pixel (ON). Otherwise, the pixel of interest is outputted as a white pixel (OFF).

(1H) The pixel of interest located in the center of the vertical 1×9-pixel filter is a black pixel.

(2H) The black run length value in the pixel of interest is greater than or equal to a threshold (TH_AH) defined in advance.

(3H) The white run length value of any one of the four pixels on the upper side of the pixel of interest is greater than or equal to a threshold (TH_BH) defined in advance.

(4H) The white run length value of any one of the four pixels on the lower side of the pixel of interest is greater than or equal to a threshold (TH_CH) defined in advance.

Here, in the determination whether these conditions are satisfied, both the white run map image and the black run map image are referred to. Further, the values TH_AV, TH_BV, TH_CV, TH_AH, TH_BH, and TH_CH may be different from each other. Alternatively, some of them may be the same.

Here, the size of the filter may be variable in accordance with the width of a dotted line to be detected.

From the black and white run map filtering module 1433V, the black pixels of the ruled line illustrated in FIG. 16A are outputted as black pixels (ON), while the black pixels of the character illustrated in FIG. 16B are outputted as white pixels (OFF).

The black and white run map filtering module 1434 is connected to the black and white run map filtering module 1433H, the black and white run map filtering module 1433V, and the logical product processing module 1441. The black and white run map filtering module 1434 generates a logical sum between the image in which horizontal ruled lines alone have been extracted and which is obtained from the black and white run map filtering module 1433H and the image in which vertical ruled lines alone have been extracted and which is obtained from the black and white run map filtering module 1433V, such as to generates an image composed of ruled lines alone in which dotted lines have been converted into solid lines. Then, the generated image is transferred to the logical product processing module 1441.

The logical product processing module 1441 is connected to the image receiving module 1310, the logical sum processing module 1434, and the image output module 1350. The logical product processing module 1441 generates a logical product between the image composed of ruled lines alone in which dotted lines have been converted into solid lines and which is obtained from the logical sum processing module 1434 and the image obtained from the image receiving module 1310, so as to generate an image composed of ruled lines alone containing dotted lines. Then, the generated image is transferred to the image output module 1350.

The image output module 1350 is connected to the logical product processing module 1441. The image output module 1350 receives the image composed of ruled lines alone from the logical product processing module 1441, and then outputs the image.

Figure 17A:
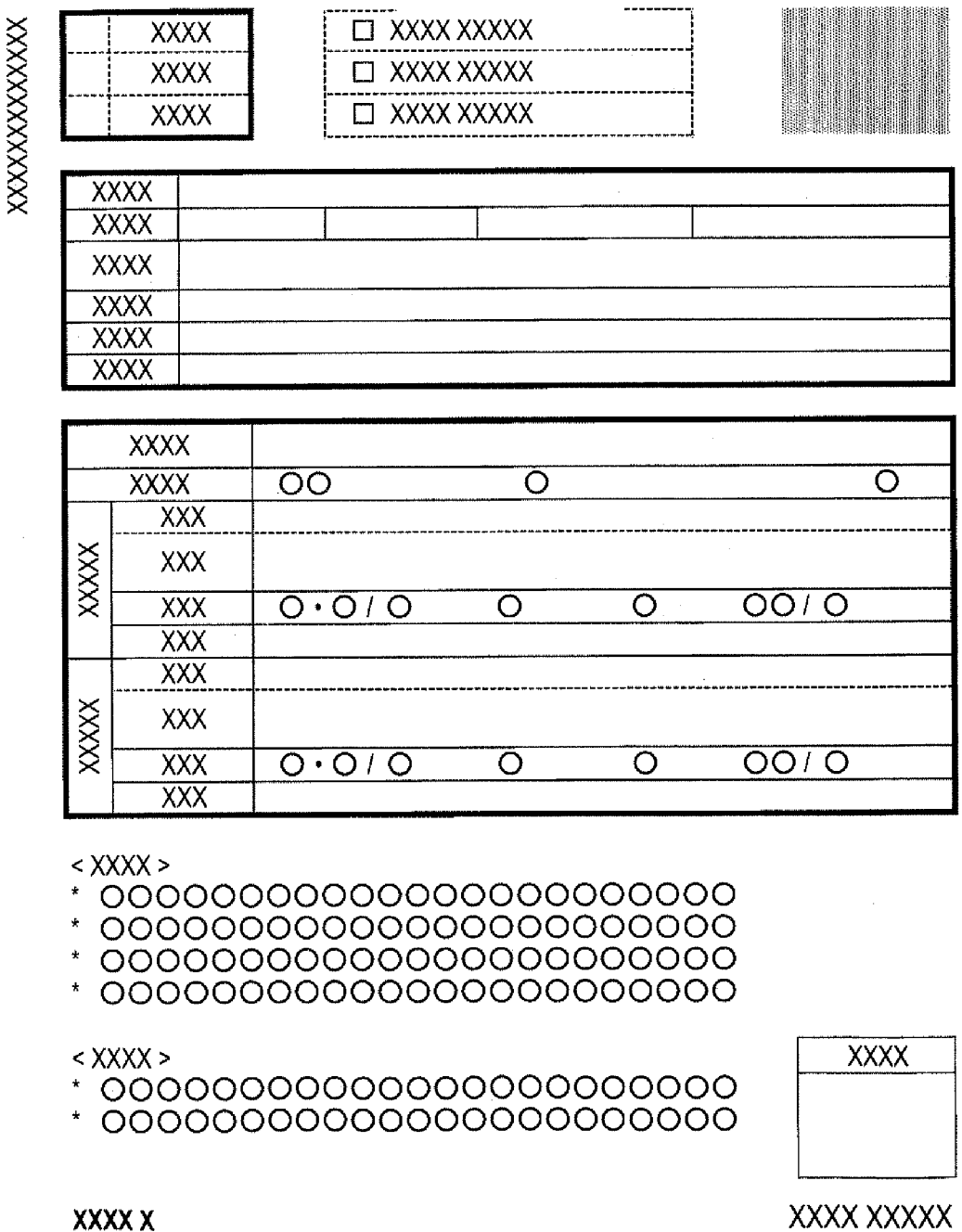
FIGS. 17A and 17B are explanation diagrams for showing an example of processing according to a second exemplary embodiment.
Figure 17B:
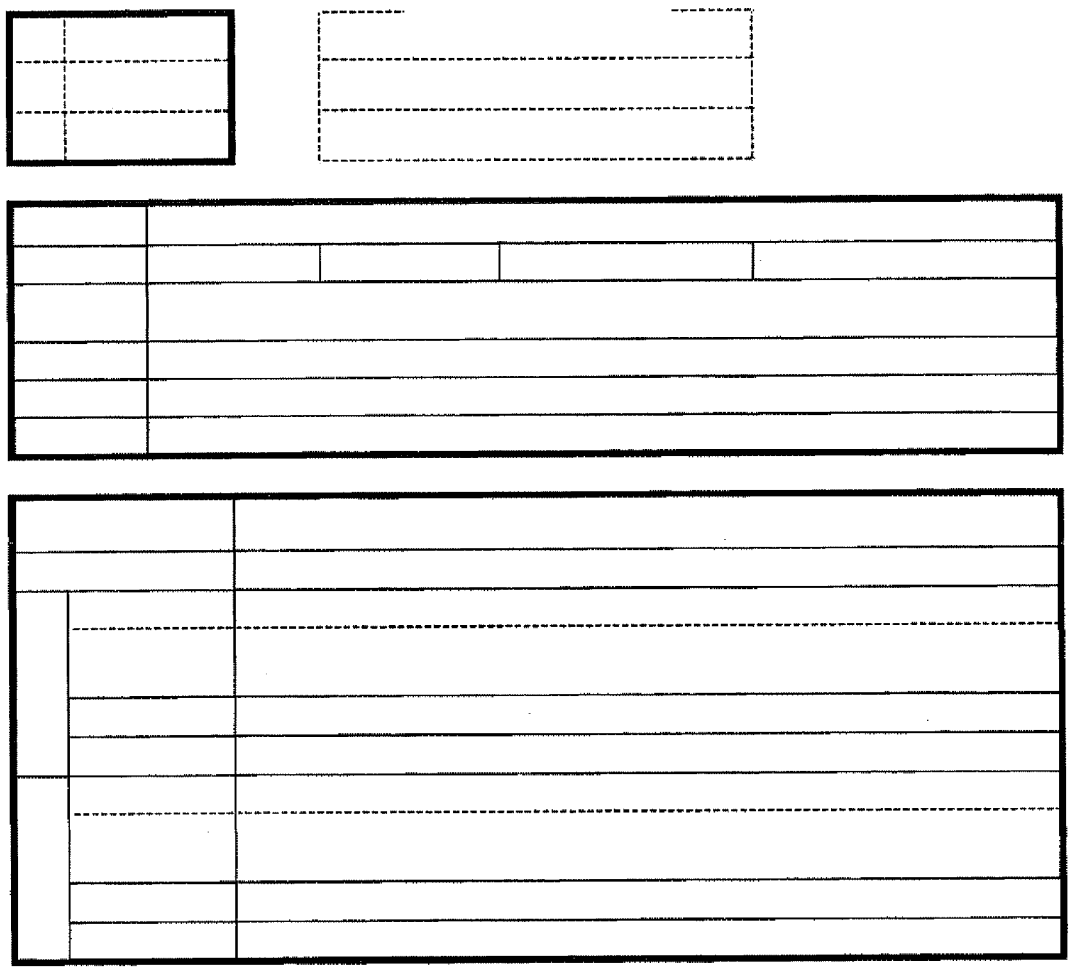

FIGS. 17A and 17B are explanation diagrams for showing an example of processing according to the second exemplary embodiment. The received image 1710 is an example of an image received by the image receiving module 1310, and contains characters, a photographic image, and ruled lines such as dotted lines and solid lines. The characters in the received image 1710 in FIG. 17A are represented as symbols "X" or "o", etc. The output image 1720 is obtained as a result of the processing according to the second exemplary embodiment, and is outputted from the image output module 1350. As such, an image composed of ruled lines alone such as dotted lines and solid lines is obtained.

Figure 18:
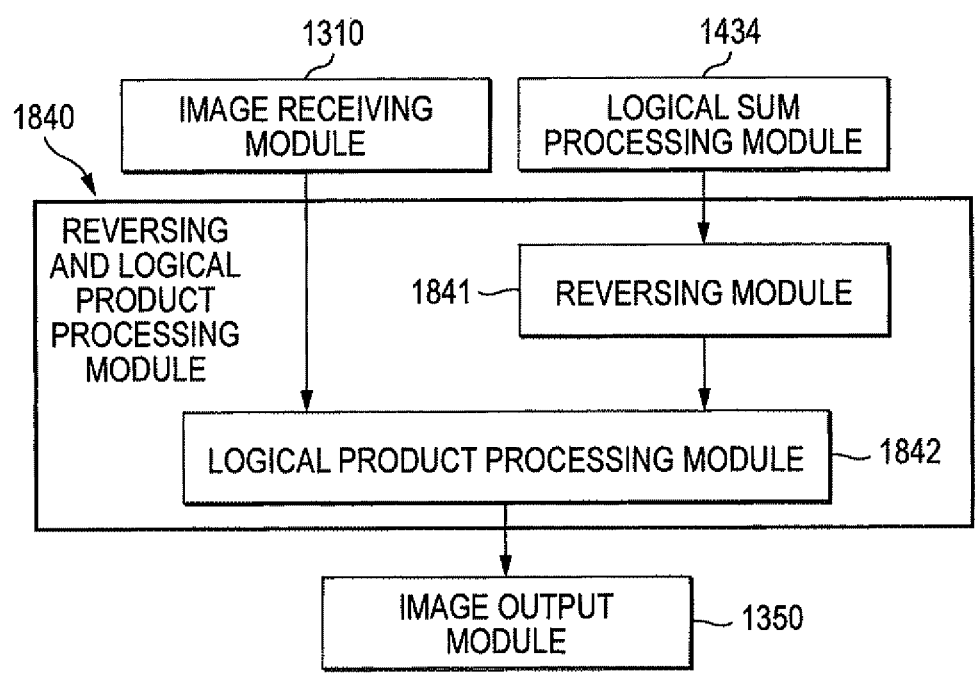
FIG. 18 is a detailed module configuration diagram for an exemplary configuration of a reversing and logical product processing module according to a third exemplary embodiment.

FIG. 18 is a detailed module configuration diagram for an exemplary configuration of a reversing and logical product processing module 1840 according to a third exemplary embodiment. This configuration is obtained when the logical product generating module 1340 in the second exemplary embodiment is replaced by the reversing and logical product processing module 1840. Here, like parts to those in the second exemplary embodiment are designated by like numerals. Thus, duplicate description is omitted.

The reversing and logical product processing module 1840 has a reversing module 1841 and a logical product processing module 1842.

The reversing module 1841 is connected to the logical sum processing module 1434 and the logical product processing module 1842, and performs reversing processing on the image composed of ruled lines alone in which dotted lines have been converted into solid lines and which is received from the logical sum processing module 1434. The reversing processing is equivalent to that performed by the reversing module 231 in the first exemplary embodiment. Then, the reversed image is transferred to the logical product processing module 1842.

The logical product processing module 1842 is connected to the image receiving module 1310, the reversing module 1841, and the image output module 1350. The logical product processing module 1842 generates a logical product between the image received from the image receiving module 1310 and the reversed image received from the reversing module 1841, so as to generate an image composed of characters alone in which ruled lines have been deleted. Then, the image composed of characters alone is transferred to the image output module 1350.

The image output module 1350 is connected to the logical product processing module 1842, and outputs the image received from the logical product processing module 1842. For example, the image may be outputted to an optical character reader, and then the optical character reader may perform character recognition.

Figure 19:
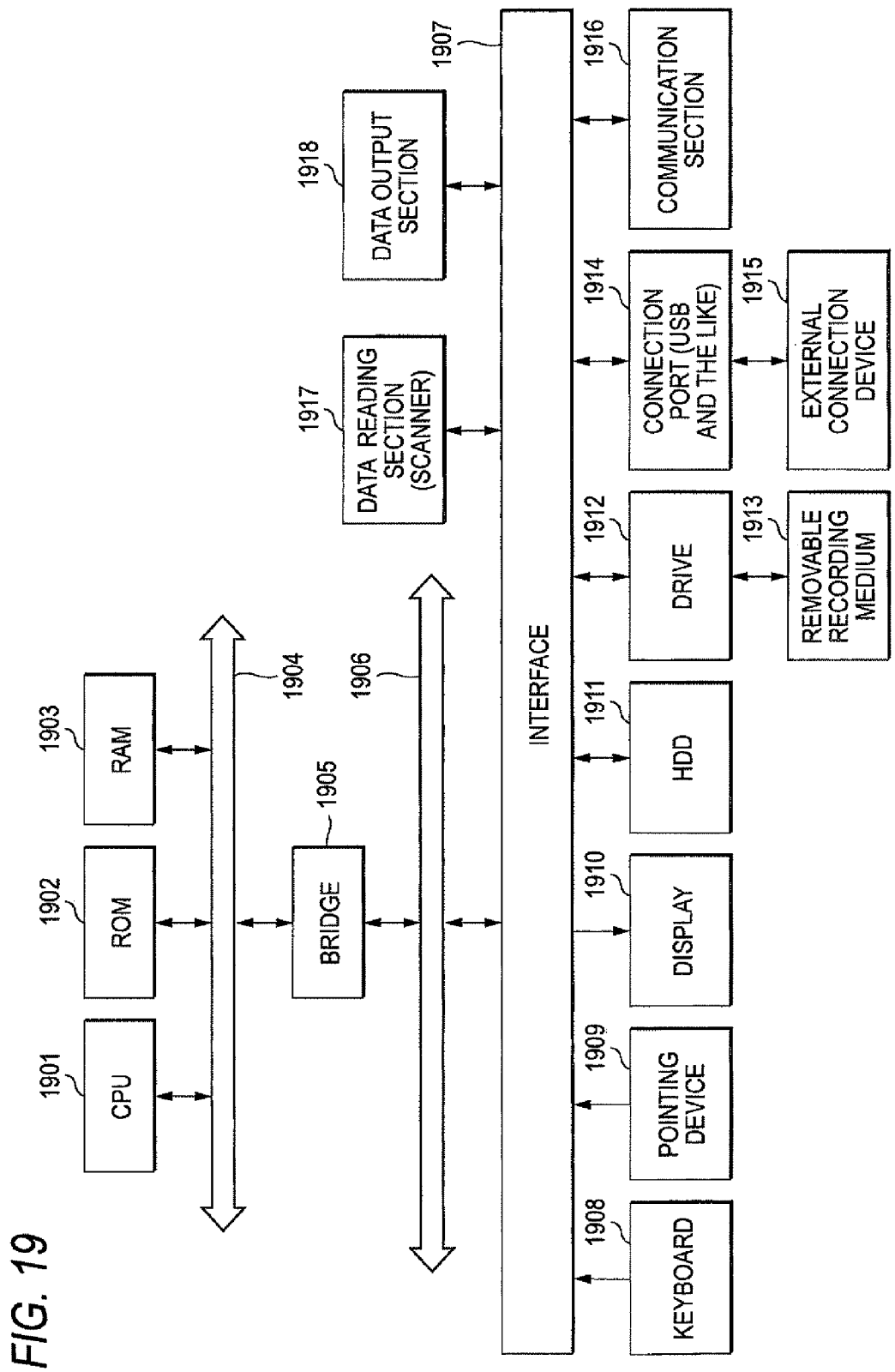
FIG. 19 is a configuration diagram showing an example of a hardware configuration of a computer for implementing first to third exemplary embodiments.

An example of hardware configuration of the image processing apparatus of the above-mentioned exemplary embodiment is described below with reference to FIG. 19. The configuration shown in FIG. 19 is constructed from a personal computer (PC) or the like. This hardware configuration has: a data reading section 1917 such as a scanner; and a data output section 1918 such as a printer.

The CPU (Central Processing Unit) 1901 is a control section for executing the processing according to a computer program that describes the execution sequence of the various kinds of modules described in the above-mentioned exemplary embodiments, that is, the white run map image generating module 222H, the white run map filtering module 223H, the logical sum processing module 224H, the black run map image generating module 225H, the threshold processing module 226H, the contraction processing module 232, the black and white run map filtering module 1433H, and the like.

The ROM (Read Only Memory) 1902 stores programs, calculation parameters, and the like used by the CPU 1901. The RAM (Random Access Memory) 1903 stores: programs used in the execution by the CPU 1901; parameters that vary in accordance with the execution; and the like. These units are connected to each other through a host bus 1904 constructed from a CPU bus and the like.

The host bus 1904 is connected through the bridge 1905 to the external bus 1906 such as a PCI (Peripheral Component Interconnect/Interface) bus.

The keyboard 1908 and the pointing device 1909 such as a mouse are input devices operated by an operator. The display 1910 is constructed from a liquid crystal display or a CRT (Cathode Ray Tube), and displays various kinds of information in the form of a text and image information.

The HDD (Hard Disk Drive) 1911 has a hard disk in the inside, and drives the hard disk so as to record or reproduce programs and information executed by the CPU 1901. The hard disk stores the image received by the image receiving module 110, the run map image, and the like. Further, various kinds of computer programs, like various kinds of data processing programs other than those described above, are stored.

The drive 1912 reads out data or a program recorded on the presently-attached removable recording medium 1913 such as a magnetic disk, an optical disk, a magneto-optical disk, and a semiconductor memory. Then, the data or the program is provided to the RAM 1903 connected through the interface 1907, the external bus 1906, the bridge 1905, and the host bus 1904. The removable recording medium 1913 may be used also as a data recording region similarly to the hard disk.

The connection port 1914 is a port to which an external connection device 1915 is connected, and has connection sections of USB, IEEE 1394, and the like. The connection port 1914 is connected to the CPU 1901 and the like through the interface 1907, the external bus 1906, the bridge 1905, the host bus 1904, and the like. The communication section 1916 is connected to the network, and executes data communication with the outside. The data reading section 1917 is constructed from a scanner or the like, and executes document reading. The data output section 1918 is constructed from a printer or the like, and executes document data output.

Here, the hardware configuration of the image processing apparatus shown in FIG. 19 is illustrative. Thus, the present exemplary embodiment is not limited to the configuration shown in FIG. 19, and may be another one as long as the modules described in the present exemplary embodiment are implemented. For example, a part of the modules may be constructed from dedicated hardware (such as an application specific integrated circuit (ASIC)). Alternatively, a mode may be employed that a part of the modules are located in an external system and connected through a communication line. Further, a plurality of systems like that shown in FIG. 19 may be connected to each other through a communication line, and operate in a cooperative manner. Furthermore, the present configuration may be incorporated in a copying machine, a facsimile machine, a scanner, a printer, a combined machine (an image processing apparatus having any two or more functions of a scanner, a printer, a copying machine, a facsimile machine, and the like), or the like.

In the above-mentioned exemplary embodiments, the processing has been decreased separately for the horizontal direction and for the vertical direction. Instead, after one part of the processing is performed, the image may be processed in a state of being rotated by 90 degrees. Further, the processing in the horizontal direction and the processing in the vertical direction may be performed in parallel to each other. Alternatively, they may be performed serially.

Here, various kinds of the above-mentioned exemplary embodiments may be combined (for example, a module in an exemplary embodiment may be incorporated into another exemplary embodiment, or may replace a module in an exemplary embodiment). Alternatively, a technique described in the section of background art may be employed as the contents of processing of a module.

Further, in the description of the exemplary embodiments, in the comparison with a value defined in advance, the expressions "greater (longer) than or equal to", "smaller (shorter) than or equal to", "greater than (exceeding)", "smaller than", and the like may be replaced by "greater (longer) than", "smaller (shorter) than", "greater than or equal to", "smaller than or equal to", and the like, as long as conflict does not arise in the combination.

Here, the programs described above may be provided in the form of being stored in a recording medium. Further, the programs may be provided through communication section. In this case, for example, each program described above may be regarded as an invention in a "computer-readable recording medium that carries a program".

A "computer-readable recording medium that carries a program" indicates a computer-readable recording medium that carries a program and is used for installation and execution of a program, circulation of a program, or the like.

Here, employable recording media include: a digital versatile disk (DVD) such as a DVD-R, a DVD-RW, and a DVD-RAM according to the standard set forth by the DVD Forum; a DVD+R, a DVD+RW, and the like set forth by DVD+RW; compact disks (CDs) such as a read-only memory (CD-ROM), a CD recordable (CD-R), and a CD rewritable (CD-RW); a Blu-ray Disc (registered trademark); a magneto-optical disk (MO); a flexible disk (FD); a magnetic tape; a hard disk; a read-only memory (ROM); an electrically erasable and programmable read only memory (EEPROM); a flash memory; and a random access memory (RAM).

Further, the programs described above or a part of them may be saved or circulated in the form of being recorded on the recording medium. Furthermore, the programs may be transmitted by communication through a transmission medium like a wired network, a wireless communication network, or a combination of these which is used in a local area network (LAN), a metropolitan area network (MAN), a wide area network (WAN), the Internet, an intranet, an extranet, or the like. Further, the programs may be transmitted on carrier waves.

Further, each program described above may be a part of another program, or alternatively may be recorded on a recording medium together with other programs. Further, each program may be divided and recorded on a plurality of recording media. Furthermore, any recording mode such as compression and encryption may be employed as long as reproduction is available.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an image receiving section that receives an image contains a line having breaks;
   a succession value image generating section that generates a succession value image having as a pixel value the number of times of succession of black or white pixels in the image received by the image receiving section; and
   a solid-line converting section that, based on the succession value image generated by the succession value image generating section, performs solid-line conversion in which the line having breaks is changed into a solid line.

2. The image processing apparatus according to claim 1, wherein
   the solid-line converting section adopts, as two ends, two first pixels extracted from the pixels in the succession value image based on comparison with a first threshold value, and
   the solid-line converting section, when a pixel between the first pixels is of a second pixel extracted based on comparison with a second threshold value, determines the second pixel to be a break in the line having breaks, so as to perform solid-line conversion.

3. The image processing apparatus according to claim 1, further comprising:
   a separating section that, based on an image generated based on the solid line generated by the solid-line conversion in the solid-line converting section, separates a pixel group that is in contact with a solid line or the line having breaks within the image received by the image receiving section.

4. The image processing apparatus according to claim 2, further comprising:
   a separating section that, based on an image generated based on the solid line generated by the solid-line conversion in the solid-line converting section, separates a pixel group that is in contact with a solid line or the line having breaks within the image received by the image receiving section.

5. The image processing apparatus according to claim 1, further comprising:
   a white succession value image generating section that generates a white succession value image having as a pixel value the number of times of succession of white pixels within the image obtained by the solid-line conversion in the solid-line converting section;
   a black succession value image generating section generates a black succession value image having as a pixel value the number of times of succession of black pixels within the image obtained by the solid-line conversion in the solid-line converting section; and
   a line segment extracting section that, based on the white succession value image generated by the white succession value image generating section and the black succession value image generated by the black succession value image generating section, extracts a line segment from the image received by the image receiving section.

6. The image processing apparatus according to claim 2, further comprising:
   a white succession value image generating section that generates a white succession value image having as a pixel value the number of times of succession of white pixels within the image obtained by the solid-line conversion in the solid-line converting section;
   a black succession value image generating section generates a black succession value image having as a pixel value the number of times of succession of black pixels within the image obtained by the solid-line conversion in the solid-line converting section; and
   a line segment extracting section that, based on the white succession value image generated by the white succession value image generating section and the black succession value image generated by the black succession value image generating section, extracts a line segment from the image received by the image receiving section.

7. The image processing apparatus according to claim 3, further comprising:
   a white succession value image generating section that generates a white succession value image having as a pixel value the number of times of succession of white pixels within the image obtained by the solid-line conversion in the solid-line converting section;
   a black succession value image generating section generates a black succession value image having as a pixel value the number of times of succession of black pixels within the image obtained by the solid-line conversion in the solid-line converting section; and
   a line segment extracting section that, based on the white succession value image generated by the white succession value image generating section and the black succession value image generated by the black succession value image generating section, extracts a line segment from the image received by the image receiving section.

8. The image processing apparatus according to claim 4, further comprising:
   a white succession value image generating section that generates a white succession value image having as a pixel value the number of times of succession of white pixels within the image obtained by the solid-line conversion in the solid-line converting section;
   a black succession value image generating section generates a black succession value image having as a pixel value the number of times of succession of black pixels within the image obtained by the solid-line conversion in the solid-line converting section; and
   a line segment extracting section that, based on the white succession value image generated by the white succession value image generating section and the black succession value image generated by the black succession value image generating section, extracts a line segment from the image received by the image receiving section.

9. An image processing method comprising:
   receiving an image contains a line having breaks;
   generating a succession value image having as a pixel value the number of times of succession of black or white pixels in the received image; and
   based on the generated succession value image, performing solid-line conversion in which the line having breaks is changed into a solid line.

10. A non-transitory computer readable medium storing a program causing a computer to execute a process for image processing, the process comprising:
   receiving an image contains a line having breaks;
   generating a succession value image having as a pixel value the number of times of succession of black or white pixels in the received image; and based on the generated succession value image, performing solid-line conversion in which the line having breaks is changed into a solid line.

* * * * *